April 27, 1965  K. B. LOW, JR., ETAL  3,180,201
MUSIC NOTE PITCH TEACHING DEVICE
Filed Nov. 18, 1963  2 Sheets-Sheet 1
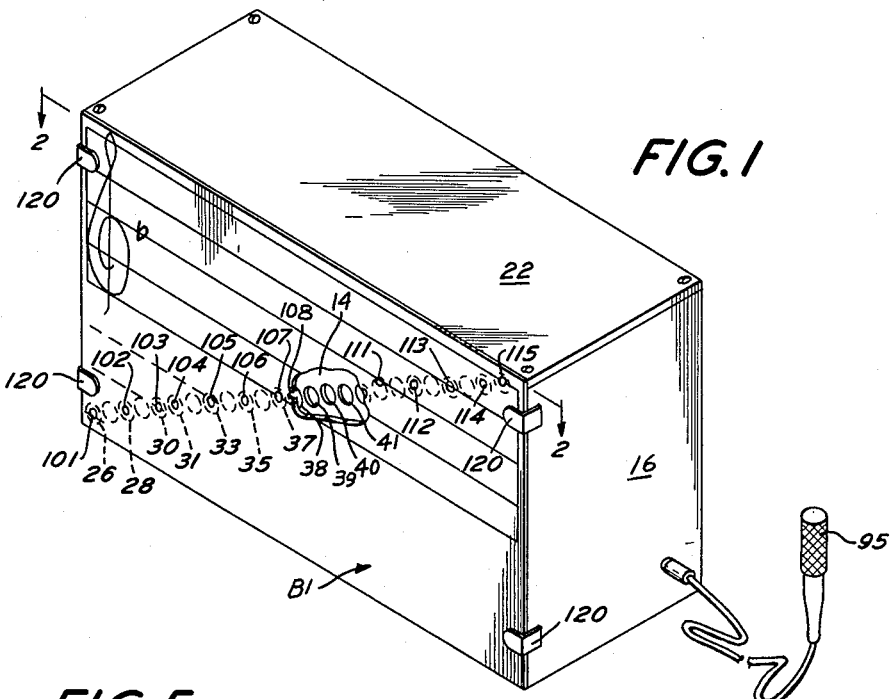
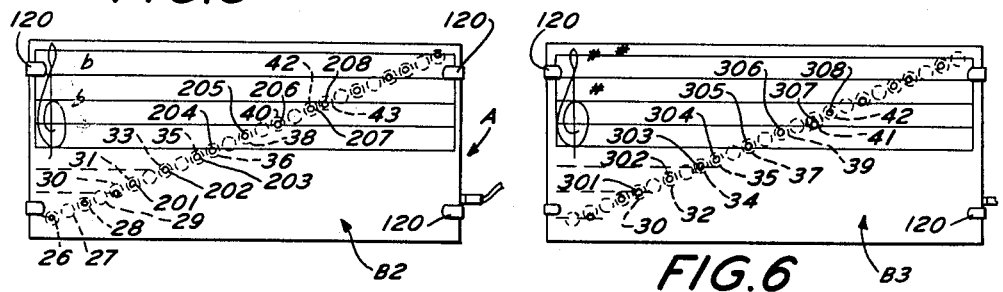
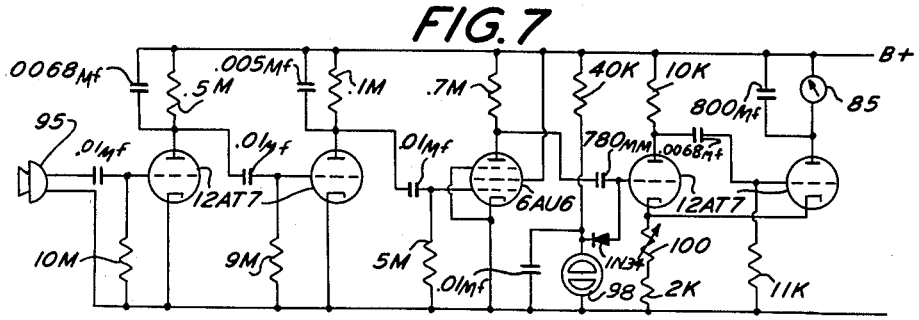
INVENTORS
KENNETH B. LOW, JR.
CHARLES GOETZ-GABOR
BY *Bilher & Moyerman*
ATTORNEYS April 27, 1965  K. B. LOW, JR., ETAL  3,180,201
MUSIC NOTE PITCH TEACHING DEVICE
Filed Nov. 18, 1963  2 Sheets-Sheet 2

INVENTORS
KENNETH B. LOW, JR.
CHARLES GOETZ-GABOR
BY

ATTORNEYS.

United States Patent Office 3,180,201
Patented Apr. 27, 1965

3,180,201
MUSIC NOTE PITCH TEACHING DEVICE
Kenneth B. Low, Jr., 4230 Regent St., Philadelphia, Pa., and Charles Goetz-Gabor, 401 S. Narbeth Ave., Narbeth, Pa.
Filed Nov. 18, 1963, Ser. No. 324,350
8 Claims. (Cl. 84—477)

This invention relates to a music note pitch teaching device, and more particularly relates to an apparatus into which a pupil sings a note of the scale and a visual indication of that tone will appear on a diatonic staff in correct relationship to other notes in that key.

In teaching music, especially instructional singing, it is difficult for the untrained pupil to read music and make a voice sound of exactly the right pitch corresponding to each of the notes that he reads. As is well known, there are fifteen major scales in common use with fifteen tonics or keynotes, the key signatures for the major scales being C, G, D, A, E, F, B♭, E♭, A♭ (harmonic keys) and B, F♯, C♯, D♭, G♭, and C♭ (enharmonic keys). In effect, there are only twelve possible different keys since the enharmonic tones or keys, C♯-D♭, F♯-G♭, and B-C♭, while they have different letter names, have the same pitch. In addition, there are the same number of minor scales which have the same signature as its relative major, but accidentals are added wherever necessary. The major scale is a succession of eight notes from any note to its octave, so arranged that a semi-tone or half step appears between the third and fourth degrees, and also between the seventh and eighth degrees reckoning upward. The minor scale derives its name from the fact that the third is a semi-tone lower than that of the major scale, thus producing a smaller (or minor) interval between the tonic and the mediant.

It is therefore apparent that a student is likely to become confused in not only relating the various scales to one another, but also in recognizing and distinguishing the pitch of the tone which he is singing.

The ordinary method of blackboard instruction is a laborious and tedious one for both the student and the instructor, and has not proven particularly effective inasmuch as the average child is unable to sing by sight even after prolonged courses in blackboard materials. While combined visual and audio training aids have been employed in the past, each of the prior art devices have been ineffective and deficient in that they have depended upon tuned devices, for example, reeds, to produce the signal, and consequently neglected overtone content, or they utilized colored lights and dimmed lights to indicate the response to sharps and flats from the fundamentals. Furthermore these prior constructions were quite sensitive in their reactions to the volume of the input sound so as to result in deviations in the output indication.

Accordingly, the general object of the instant invention is to aid in the teaching of music reading and solfeggio.

Another object of this invention is to provide a music note teaching device which will enable the student to learn more rapidly the positions on the staff or clef the different solfeggio tones for all of the keys.

Still another object of this invention is to provide a music aid teaching device which permits the pupil to thoroughly familiarize himself in how the key signature (system of sharps and flats) affects the pitch of the different notes on the staff and the various intervals between them.

A further object of this invention is to provide a music note pitch teaching device in which a plurality of key signature staffs are interchangeable so as to permit the device to be used with any particular diatonic scale simply by placing a scale board in front of a visually indicating panel.

Yet another object of this invention is to provide a music note pitch teaching device which will yield an accurate visual indication of the note being sung.

Another object of this invention is to provide a music note pitch teaching device which employs a single, continuously-variable light beam with a hairline indication so as to make it possible to tell exactly where the tone being sung is, and whether that tone is a trifle too low or too high for a particular note on the scale.

Another object of this invention is to provide a music note pitch teaching device which is responsive only to the pitch of the fundamental tone of the note being sung so as to eliminate "color" or overtone content of the particular voice which is singing.

Another object of our invention is to provide a music note pitch teaching device whose response is independent of the volume of the note being sung thereby eliminating the confusion resulting from the use of prior are devices which employed discrete lamps that would become brighter or dimmer with variation in volume.

Another object of our invention is to provide a music note pitch teaching device in which the visual indication of the note being sung will be an accurate representation of the frequency of that note.

Other objects of our invention are to provide a music note pitch teaching device which will eliminate the need for blackboard instructing in sight reading.

Other objects of this invention are to provide an improved device of the character described which is sturdy in construction, economically produced, and highly efficient and effective in operation.

With the above and related objects in view, this invention consists of the details of construction and combination of parts as will be more fully understood from the following detailed description when read in conjunction with the accompanying drawing in which:

FIGURE 1 is a perspective view, and partly broken away, of a music note pitch teaching device comprising this invention.

FIGURE 5 is a front elevational view of the music note pitch teaching device showing a musical staff panel in the key of B-flat mounted thereon.

FIGURE 6 is a front elevational view of the music note pitch teaching device with an A-major key signature panel mounted thereon.

FIGURE 7 is a schematic diagram an example of the general type of electrical circuit embodied in this invention.

FIGURE 8 is a block diagram of the electrical circuit.

Figure 2:
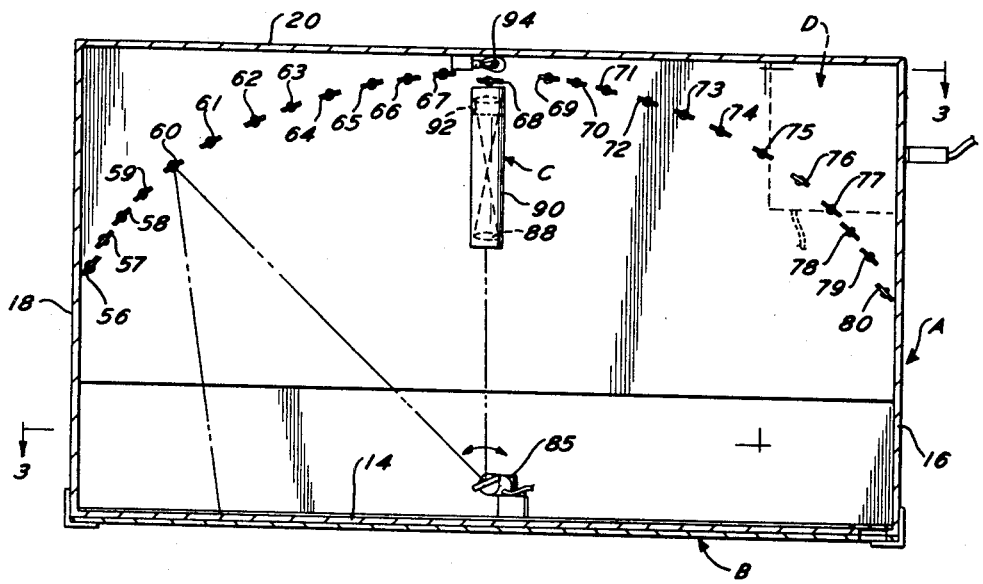
FIGURE 2 is a sectional view taken along lines 2—2 of FIG. 1.

Referring now in greater detail to the drawings in which similar reference characters refer to similar parts, there is illustrated a music note pitch teaching device comprising a housing, generally designated as A, a plurality of apertured musical staff panels B in the various key signatures, an optical system C for directing a beam of light on the desired note aperture, and an electrical circuit D for translating the pitch of a note being sounded into an electrical signal which will cause the beam of light to be deflected and illuminate the particular note aperture corresponding to the note being sounded.

The housing A is a substantially rectangular box, preferably of wood, although sheet metal or even paperboard may prove satisfactory. The box or frame A includes a base 12, a front panel 14, side walls 16 and 18, a back wall 20, and a cover 22. The front panel 14 has a plurality of circular apertures 26 to 50 inclusive therein which are diagonally-arranged in adjacently spaced disposition. See FIGURE 3. Each of the apertures 26 to 50 is covered by a translucent screen, and a strip 24 of ground glass or translucent plastic has been found entirely suitable for this purpose although individual translucent disks (not shown) may be incorporated within the respective apertures. A sloping shelf or ramp 52 is diagonally supported in the housing A spaced below the apertures 26 to 50 but parallel to the line passing through their centers.

A plurality of reflectors or mirrors 56 to 80 inclusive, corresponding in number to the apertures 26 to 50, are supported on stems 82 on the shelf 52 in a generally arcuate or semi-circular configuration at the rearward portion of the housing A. See FIGURES 2, 3 and 4. The stems 82 may be flexible or soft metal pins which can be twisted about their longitudinal axes to provide for rotatable adjustment of the respective fixed mirror elements 56 to 80 and canted forward or backward to permit vertical alignment of a light beam from the projector C with respect to the various apertures 26 to 50. It is also apparent that a universal ball-and-socket joint may be substituted for the stem elements 82, and it is to be understood that other equivalent structures may be employed instead of the illustrated embodiment. The significant point of the adjustment stem construction is to note that the various mirror elements must reflect a collimated light beam initiating at the source C and impinging upon a rotatable mirror 85 (D'Arsonval Galvanometer) so that the beam will be focused upon and fill the translucent screen of the respective apertures 26 to 50.

Figure 3:
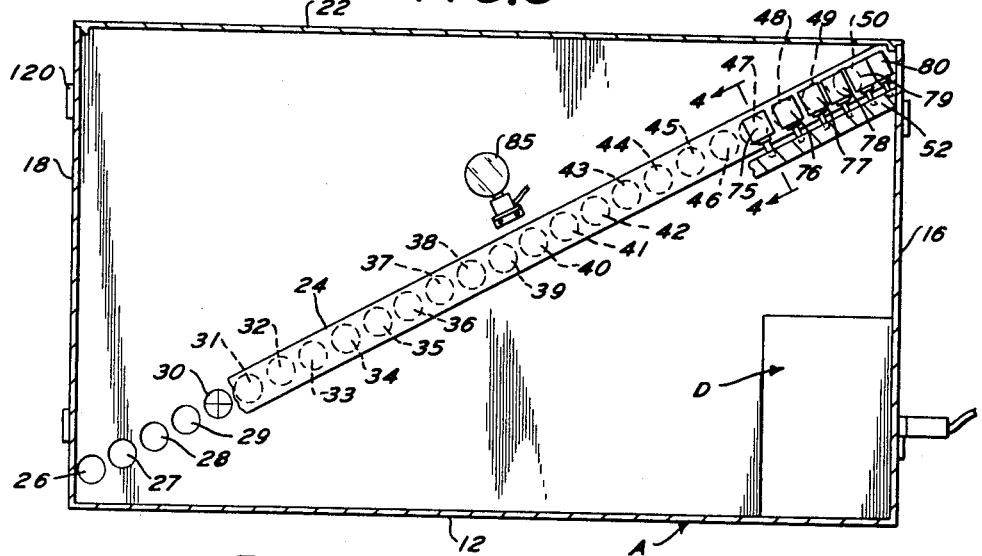
FIGURE 3 is a sectional view taken along lines 3—3 of FIG. 2.
Figure 4:
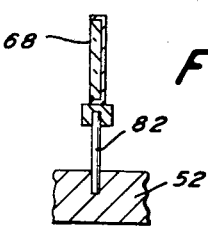
FIGURE 4 is a sectional view taken along lines 4—4 of FIG. 3.

The optical projector C is essentially a collimating telescope having an objective lens 88 mounted at one end of a barrel 90 and a cross hair or reticle 92 supported at the other end. A lamp 94 illuminates the reticle or cross hair 92 which is located behind the focal plane of the lens 88 so that the total light path between the collimator, the rotatable mirror 85, the stationary reflectors 56 to 80, and the screens of the respective apertures 26 to 50 is the same and the image of the cross hair will be sharply focused within the illuminated aperture. Thus, with the rotatable D'Arsonval mirror 85 turned as indicated in FIGURE 2, for example, the light beam will be reflected from stationary mirror 60 to illuminate the screen of aperture 30 with the cross hair sharply defined therein as shown in FIGURE 3.

As has been mentioned previously, the rotatable mirror 85 is essentially part of a D'Arsonval Galvanometer system and is mounted upon the movable coil (not shown) which is suspended between the poles of the permanent magnet thereof. For practical purposes, the galvanometer deflection is proportional to the current input therein, and the turning of the coil similarly causes rotation of the plane mirror 85 so that the beam from the collimator C will be deflected upon one of the plane stationary mirrors 56 to 80 and accordingly reflected within the appropriate aperture.

The electronic or electrical circuit includes a microphone 95 which is connected across the grid of a 12AT7 twin audio amplifier tube, for example. Suitable capacitors are mounted across the plate resistors of the respective halves of the twin triode. These last-mentioned capacitors are high frequency limiters which partially filter out the overtones in the human voice from the fundamental note being sung into the microphone 95. The output of the audio amplifier and filter is directed into a wave shaping circuit which includes a 6AU6 tube, for example. The 6AU6 tube is highly overdriven to cutoff most of the time of each cycle, and only conducts briefly when the most positive parts of the input signal appear on the grid. This occurs at the fundamental tone frequency, independently of the amount of overtone content. The result is that a series of pips, corresponding in cycle frequency to the fundamental tone of the note being sung, is imposed upon the grid of the first half of the second twin triode 12AT7. The second twin triode 12AT7 is connected as a flip-flop or integrating circuit, and executes one flip-flop for each input pip. The grid of the first half of the second 12AT7 is coupled through a 1N34 diode to a voltage divider network which includes a 40K resistor and a neon bulb 98. The neon bulb 98 functions as an automatic constant voltage regulator. A variable resistor 100 in the cathode circuit of the first half of the cascaded multi-vibrator controls the amplitude of the pips which are the D.C. output of the second half. Thus, the second 12AT7 acts as a frequency meter, since the pulses of current at the plate of the second half of the cascade will produce pips of constant amplitude, but the number of pips will be proportional to the frequency of the note being sung into the microphone. Therefore, since the number of current pips which are fed into the coil of the galvanometer affects the mean current ratio, the galvanometer and hence the mirror deflection will be proportional to the frequency or pitch of the note being sung. The potentiometer 100 is adjusted, together with the zero-position of the galvanometer, so that the range of deflection of the light beam corresponds to the desired range of scale frequencies to be used.

It is to be observed that each of the apertures 26 to 50 are correlated with the deflection of the galvanometer mirror 85 so as to represent half-tone increments—i.e. twelve equally tempered intervals per octave. This permits the device to be used in conjunction with any particular diatonic scale simply by placing a scale or staff panel B of a particular key signature in abutment with the front panel 14. It is also to be noted that apertures 26 to 50 are arranged on a diagonal in the panel 14 so that their respective centers fall on a single line.

The musical staff panels B are fifteen in number, C♯ and D♭, F♯ and G♭, and B and C♭ being constructed respectively so that the same apertures are used, and indicate the positions on the staff for the different solfège tones in each of the keys. For purposes of illustration herein only the keys of F, B♭ and A are embodied, key signature panels B1, B2, and B3 being shown respectively in FIG. 1, 5 and 6, since these will be sufficient to demonstrate the applicability of the instant invention in teaching how the key signature affects the pitches of the various notes on the staff.

The key of F signature panel B1 comprises a black paperboard sheet with the G clef and attendant staff and leger lines printed thereon in white. A plurality of openings 101 to 115 are formed or cut in the panel B1 (fifteen in number) to designate the solfège tones for two full octaves in the diatonic scale of the key of F. These openings 101 to 115 are smaller than the apertures 26 to 50 in the panel 14 and are approximately fifty to sixty percent of the area of the latter. While the openings 101 to 115 are shown in the drawings to be circular in configuration, they may also be oval to more accurately simulate the normal manner in which notes are depicted. In addition to being smaller in area to the apertures 26 to 50, it is to be observed that the openings 101 to 115 do not fall on an exact diagonal line. The reduction in diameter is necessary so that the openings 101 to 115, which represent the solfège tones in the key of F, will register with the proper apertures in the panel 14, which, as has been said before, indicate and represent half- or semi-tones. Accordingly when the staff panels B are mounted in face-to-face abutment with the panel 14 by clips 120 secured to the housing A, the solfège tone openings must overlie the appropriate half-tone aperture.

For example, in the key of F, as shown in FIGURE 1, the first note F (do) is represented by the opening 101 which overlies a portion of the aperture 26. The second note (re), as symbolized by the space G in the staff, is represented by the opening 102 which overlies a portion of the aperture 28, and not aperture 27. This is so because the interval between F (do) and G (re) in the major scale is a full tone, and the successive apertures represent and designate half-tones. The note A is sung "mi" in the key of F and is represented by the opening 103 which overlies a portion of aperture 31 since the interval for the "third" is a full tone. However, B♭ (fa) is the fourth note in the lower tetrachord and hence the note fa is elevated in pitch only a half tone. Accordingly, the opening 104 registers with the aperture 32 (successive semi-tone to aperture 31). The upper tetrachord is similarly disposed.

For purposes of illustration, a chart for the diatonic scales for the signature panels B1 (key of F), B2 (key of B♭), and B3 (key of A) is set forth immediately below for illustration, it being understood that the same principles would apply to the other key signatures:

| No. | Sol-fa Syllables | Interval | Key of F | | | Key of B♭ | | | Key of A | | |
|---|---|---|---|---|---|---|---|---|---|---|---|
| | | | Note | Open. | Aper. | Note | Open. | Aper. | Note | Open. | Aper. |
| 1 | Do | | F | 101 | 26 | B♭ | 201 | 31 | A | 301 | 30 |
| | | 1 | | | | | | | | | |
| 2 | Re | | G | 102 | 28 | C | 202 | 33 | B | 302 | 32 |
| | | 1 | | | | | | | | | |
| 3 | Mi | | A | 103 | 30 | D | 203 | 35 | C♯ | 303 | 34 |
| | | ½ | | | | | | | | | |
| 4 | Fa | | B♭ | 104 | 31 | E♭ | 204 | 36 | D | 304 | 35 |
| | | 1 | | | | | | | | | |
| 5 | Sol | | C | 105 | 33 | F | 205 | 38 | E | 305 | 37 |
| | | 1 | | | | | | | | | |
| 6 | La | | D | 106 | 35 | G | 206 | 40 | F♯ | 306 | 39 |
| | | 1 | | | | | | | | | |
| 7 | Ti | | E | 107 | 37 | A | 207 | 42 | G♯ | 307 | 41 |
| | | ½ | | | | | | | | | |
| 8 | Do | | F | 108 | 38 | B♭ | 208 | 43 | A | 308 | 42 |

"Open." indicates the reference character for the respective openings in the staff panels B1, B2, and B3.
"Aper." indicates the reference characters for the apertures in the panel 14.
"Sol-fa Syllables" indicates the solfeggio scale.
"No." indicates the step in the octave of the diatonic scale.

As is apparent from the foregoing description, after tuning of the electronic circuit by the potentiometer 100 and the optical deflections by means of the respective mirrors 56 to 80, the student or pupil need merely sing the particular solfeggio note into the microphone 95. That is, the horizontal and vertical hairlines 92 are adjusted with respect to the apertures 26 to 50 so that the horizontal indication of the horizontal hairline with respect to the center of the openings in the respective keys will provide an accurate visual representation of the deviation in the note that is being sung. In this manner, it is possible to determine exactly where the pitch of the tone being sung is, and whether it is too high or too low with respect to the particular note hole on the scale. The electronic circuit and galvanometer movement (mirror drive 85) are designed to respond only to the pitch of the fundamental tone of the note being sung. Since the electronic circuit is designed to eliminate the effects of overtone content, the response as a visual indication is not affected by the "color." The output of the integrator circuit produces a constant current amplitude but is frequency modulated. Therefore, the output of the instant invention does not depend upon the volume of the note being sung. Accordingly, the visual indication is continuous and discrete so as to produce a direct translation of the frequency input as a quantitative measurement.

Although this invention has been described in considerable detail, such description is intended as being illustrative rather than limiting, since the invention may be variously embodied, and the scope of the invention is to be determined as claimed.

What is claimed is:

1. A music note pitch teaching device comprising a housing having a plurality of diagonally-arranged adjacently-spaced circular apertures therein, a translucent screen over each of the apertures, a plurality of musical staff panels each having a series of openings therein corresponding to the notes of the diatonic scale for respective key signatures, illuminating means adapted to direct a beam of light upon one of said translucent screens at a time, means to mount one of said staff panels at a time upon said housing so that particular openings in said panel register with certain of the apertures in said housing, means to convert the sound of a person's voice into a signal corresponding to the pitch of the particular fundamental tone of the audio frequency note being sung, and means responsive to the signal directing said illuminating means upon the translucent screen consonant with the particular note pitch, whereby a pupil may identify visually the particular note in the scale he is singing by the illumination of that note opening on the scale of the key signature staff which is mounted.

2. The invention of claim 1 wherein said illuminating means comprises a collimator which optically projects a light source and a rotatable reflector which causes the beam of light to impinge upon and be focused on the respective translucent screens.

3. The invention of claim 2 wherein said means for converting the sound into a signal comprises a microphone, an amplifier and filter circuit coupled with said microphone, and a wave shaping and integrator circuit translating the audio signal input from said amplifier and filter circuit into a D.C. current which is proportional to the frequency of the fundamental tone of the note being sung, and said signal responsive means comprises a galvanometer to the coil of which said reflector is secured and is rotatable therewith.

4. A music note pitch teaching device comprising a musical staff panel having a series of screened openings therein corresponding to the notes of the diatonic scale for a given key signature, projection means for directing a single beam of light upon said panel and spot illuminating an area thereon approximating the size of the screened openings, means to sweep the beam of light across the musical staff so that the illuminated spot will sequentially register with one of said openings at a time, and means responsive to an audio frequency signal actuating the means to sweep and directing the illuminated spot of light from said projection means upon the screened opening corresponding to the pitch of the note being sung.

5. A music note pitch teaching device comprising a musical staff panel having a set of screened openings therein corresponding to the notes of the diatonic scale for a given key signature, projection means for focusing upon said panel an illuminated spot of light having a peripherally defined area approximating the size of the screened openings, and sweep means responsive to an audio frequency signal directing the illuminated spot upon the screened openings which corresponds to the pitch of the note being sung, said projection means further impinging an image of a cross hair centrally focused within the illuminated spot of light whereby the displacement of the projected image of said cross hair from a central position within each of said screened openings will visually indicate an increment of error in true pitch from the note being sung.

6. A music note pitch teaching device comprising a frame, a vertical panel supported in said frame and having a plurality of diagonally-arranged, adjacently-spaced circular apertures therein, a translucent screen over each of the apertures, a like plurality of reflectors facing said apertures, a galvanometer having a pivotally supported coil, a mirror rotatable with said coil, a projector directing a beam of light toward said mirror, a plurality of musical staff panels detachably secured to said vertical panel and each having a plurality of openings therein corresponding to the notes of the diatonic scale for respective key signatures, a microphone, and an amplifier and integrator circuit converting an audio frequency input to said microphone into an output signal current proportional to the frequency of the fundamental tone being sung into the microphone and said output signal current passing through said galvanometer coil, whereby the beam of light impinging upon said mirror will be reflected therefrom upon one of said reflectors and thereafter redirected and focused upon the corresponding aperture screen so as to illuminate the opening in the key signature panel which indicates the pitch of the fundamental tone of the note being sung.

7. The invention of claim 6 wherein successive apertures in the panel indicate semi-tone graduations.

8. The invention of claim 7 wherein a cross hair image is superimposed upon the focused beam of light so as to indicate deviations in pitch of the note being sung from the note being read.

References Cited by the Examiner
UNITED STATES PATENTS

| | | | |
|---|---|---|---|
| 2,070,867 | 2/37 | Severy | 84—454 |
| 2,252,726 | 8/41 | Peck. | |
| 2,779,920 | 1/57 | Petroff | 84—470 X |
| 2,888,849 | 6/59 | Humphrey et al. | 84—470 X |

LEO SMILOW, *Primary Examiner.*